Sept. 11, 1923.

U. S. MOORE 1,467,555

TOOL BOX FOR MOTOR VEHICLES

Filed April 15, 1922

Inventor
U. S. Moore
By William J. Jacobi
Attorney

Patented Sept. 11, 1923.

1,467,555

UNITED STATES PATENT OFFICE.

ULYSSES S. MOORE, OF LOMAX, ILLINOIS.

TOOL BOX FOR MOTOR VEHICLES.

Application filed April 15, 1922. Serial No. 553,182.

*To all whom it may concern:*

Be it known that ULYSSES S. MOORE, a citizen of the United States, residing at Lomax, in the county of Henderson and State of Illinois, has invented certain new and useful Improvements in Tool Boxes for Motor Vehicles, of which the following is a specification.

My invention relates to tool boxes adapted to be carried by an automobile, and has for its primary object to provide means for carrying a tool box that will not be visible, but at the same time placed in such a position that the box will always be accessible for immediate use.

A further object of my invention is to provide means for forming a tool box in combination with the apron of one of the front fenders of the automobile, so that the apron forms approximately a cover for the tool box, with exception of a cover for the opening formed in the apron.

A still further object is to provide means for preventing any undue rattling of the box when the automobile is in motion.

And a still further object of my invention is to provide a tool box that forms a part of the fender of an automobile and therefore is not subject to loss, thus assuring the operator of the machine that the tool box is always accessible and that same is so placed on the fender of an automobile that the tools are always in front of the operator or mechanic when working on the engine.

And a still further object of my invention is to provide a tool box that can be cheaply manufactured and placed on an automobile without making any alterations necessary in the construction of the same.

These and like objects will be better understood as the description of the invention follows and as is specifically pointed out in the appended claims.

Referring to the accompanying drawings, which form a part of this specification, Figure 1 is a perspective view of an automobile fender showing my tool box attached thereto, and also showing in dotted lines an automobile chassis for the purpose of better illustrating my invention.

Referring to the drawings in detail, like numerals will be used to designate like parts in the several views.

Figure 1:
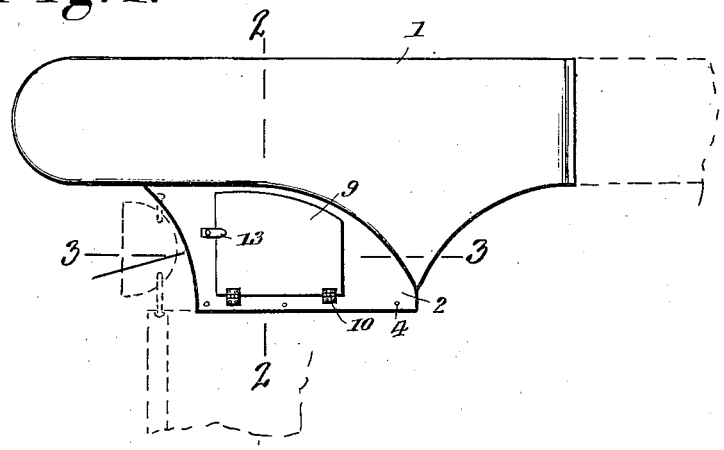
Figure 2:
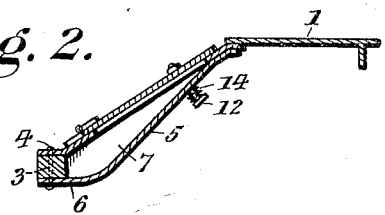
Figure 2 is a transverse section taken on line 2—2 of Fig. 1.
Figure 3:
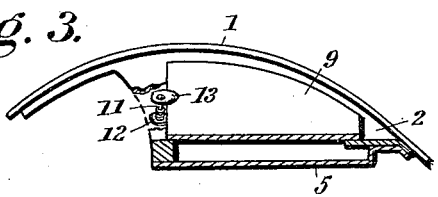
Figure 3 is a verical section taken on line 3—3 of Fig. 1.

The numeral 1 indicates one of the front fenders of an automobile constructed in the usual manner, and having formed therewith or secured by means of bolts an apron 2, which is fastened at the lower end to the frame 3 of the chassis by means of bolts 4—4. Secured to the underside of the apron 2 is a backing 5, which is either cast or forged to the apron or secured thereto by means of bolts. The lower end of the backing is secured to the underside of the frame of the car as at 6. The bolts 4 used for securing the apron to the frame of the automobile are also used in securing the backing 5 to the frame. The backing 5 is provided with end walls 7 which are formed integral with the backing and secured to the underside of the apron by means of bolts, cast or forged thereon.

From the foregoing description it can be seen that by means of the backing 5 and the end walls 7 and 8 in combination with the apron 2 that I have provided a receptacle for tools that is conveniently located for use in repairing the engine.

A cover 9 having hinges 10—10 is located on top of the apron of the fender and adapted to close an opening formed in the apron through which tools are removed or replaced within the receptacle formed between the apron and the backing 5.

A bolt 11 having a nut 12 and a head 13 extend through the apron 2 and the head 13 is in engagement with the cover 9 for preventing rattling of same, it of course being understood that the nut 12 and the spring 14 are positioned on the under side of the apron, thus keeping the head 13 in close engagement with the cover 9.

While I have shown and described the preferred embodiment of my invention, I realize that minor changes may be resorted to, without departing from the spirit and scope of the invention as claimed; therefore, I do not wish to limit myself to the exact details of construction shown.

What I claim as new and desire to protect by Letters Patent is:—

1. The combination with a fender and an apron for attaching the same to a frame of a vehicle; of a tool box secured to the under side of said apron, the latter provided with an opening whereby access to the tool box may be had, a door hingedly mounted on the upper face of said apron for covering said opening, and means associated with said apron and said door for preventing the rattling of said door when the vehicle is in motion.

2. The combination with a fender and an apron for attaching the same to the frame of a vehicle; of a tool box secured to the under side of said apron, said tool box comprising a bottom plate secured at its sides to the apron adjacent the fender and to the frame respectively, the ends of said plate being bent upwardly and secured to the under side of said apron, said apron being provided with an enlarged opening whereby access to the tool box may be had, and a door therefor hingedly mounted on the upper face of said apron and provided with means for preventing the rattling of said door when the vehicle is moving.

In testimony whereof I affix my signature.

ULYSSES S. MOORE.